(12) United States Patent
Bohn et al.

(10) Patent No.: US 9,329,910 B2
(45) Date of Patent: May 3, 2016

(54) DISTRIBUTED POWER DELIVERY

(71) Applicant: Seagate Technology LLC, Cupertino, CA (US)

(72) Inventors: Richard Esten Bohn, Shakopee, MN (US); Michael Howard Miller, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 274 days.

(21) Appl. No.: 13/923,040

(22) Filed: Jun. 20, 2013

(65) Prior Publication Data

US 2016/0011914 A1   Jan. 14, 2016

(51) Int. Cl.
*G06F 1/26* (2006.01)
*G06F 9/50* (2006.01)
*G06F 1/32* (2006.01)

(52) U.S. Cl.
CPC ............... *G06F 9/5094* (2013.01); *G06F 1/26* (2013.01); *G06F 1/3203* (2013.01)

(58) Field of Classification Search
CPC ........................................................ G06F 1/00
USPC ........................................................ 713/300
See application file for complete search history.

(56) References Cited

U.S. PATENT DOCUMENTS

| | | | |
|---|---|---|---|
| 5,532,524 A | 7/1996 | Townsley | |
| 7,467,311 B2 | 12/2008 | Bahali | |
| 7,546,475 B2 * | 6/2009 | Mayo et al. | 713/320 |
| 7,814,351 B2 | 10/2010 | Lubbers | |
| 7,836,418 B2 | 11/2010 | Binder | |
| 7,851,950 B1 | 12/2010 | Morales | |
| 8,301,742 B2 | 10/2012 | Hanson | |
| 8,305,737 B2 | 11/2012 | Ewing | |
| 8,333,316 B2 | 12/2012 | Heath | |
| 8,378,530 B1 | 2/2013 | Morales | |
| 2006/0053324 A1* | 3/2006 | Giat et al. | 713/300 |
| 2006/0082222 A1* | 4/2006 | Pincu et al. | 307/29 |
| 2009/0319808 A1* | 12/2009 | Brundridge et al. | 713/300 |
| 2010/0162006 A1* | 6/2010 | Therien et al. | 713/300 |
| 2012/0209442 A1* | 8/2012 | Ree | 700/295 |
| 2014/0143558 A1* | 5/2014 | Kuesel et al. | 713/300 |

OTHER PUBLICATIONS

Wang, SHIP:Scalable Hierarchical Power Control for Large-Scale Data Centers, TN.
Wang, SHIP: A Scalable Hierachical Power Control Architecture for Large-Scale Data Centers-Supplementary File, TN.

* cited by examiner

*Primary Examiner* — Thomas Lee
*Assistant Examiner* — Volvick Derose
(74) *Attorney, Agent, or Firm* — Cesari & Reed, LLP; Kirk A. Cesari; Christian W. Best

(57) ABSTRACT

Systems and methods are disclosed for distributed power delivery. In certain embodiments, an apparatus may comprise a device configured to control power to one or more power-consuming components via managing power usage among the one or more power-consuming components based on a priority of a task associated with the one or more power-consuming components. In certain embodiments, a device may comprise a processor configured to: receive a request to allow a component to expend an amount of power, determine if the request can be satisfied with an unallocated power budget managed by the processor, the unallocated power budget being an unallocated portion of a total power budget managed by the first processor, and allow the component to expend the amount of power when the request can be satisfied with the unallocated power budget.

24 Claims, 8 Drawing Sheets

DISTRIBUTED POWER DELIVERY

BACKGROUND

In computing environments, such as distributed computing environments, various computing components may have fluctuating power requirements. For example, devices may require more or less power based on current workload and the nature of the workload. Designing a power delivery infrastructure based around peak possible power requirements may be inefficient or costly. Therefore, systems and methods are needed for improving distributed power delivery.

SUMMARY

In certain embodiments, a device may comprise a first processor configured to: receive a first request to allow a component to expend an amount of power, determine if the first request can be satisfied with an unallocated power budget managed by the first processor, the unallocated power budget being an unallocated portion of a total power budget managed by the first processor, and allow the component to expend the amount of power when the first request can be satisfied with the unallocated power budget.

In certain embodiments, an apparatus may comprise a device configured to control power to one or more power-consuming components via managing power usage among the one or more power-consuming components based on a priority of a task associated with the one or more power-consuming components.

In certain embodiments, a computer-readable storage device may store instructions which cause a processor to perform a method comprising: receiving a first request to allow a component to expend an amount of power, receiving a priority of a first task associated with the first request, determining if the first request can be satisfied with an unallocated power budget, the unallocated power budget being an unallocated portion of a total power budget, and allowing the component to expend the amount of power when the first request can be satisfied with the unallocated power budget.

DETAILED DESCRIPTION

Figure 1:
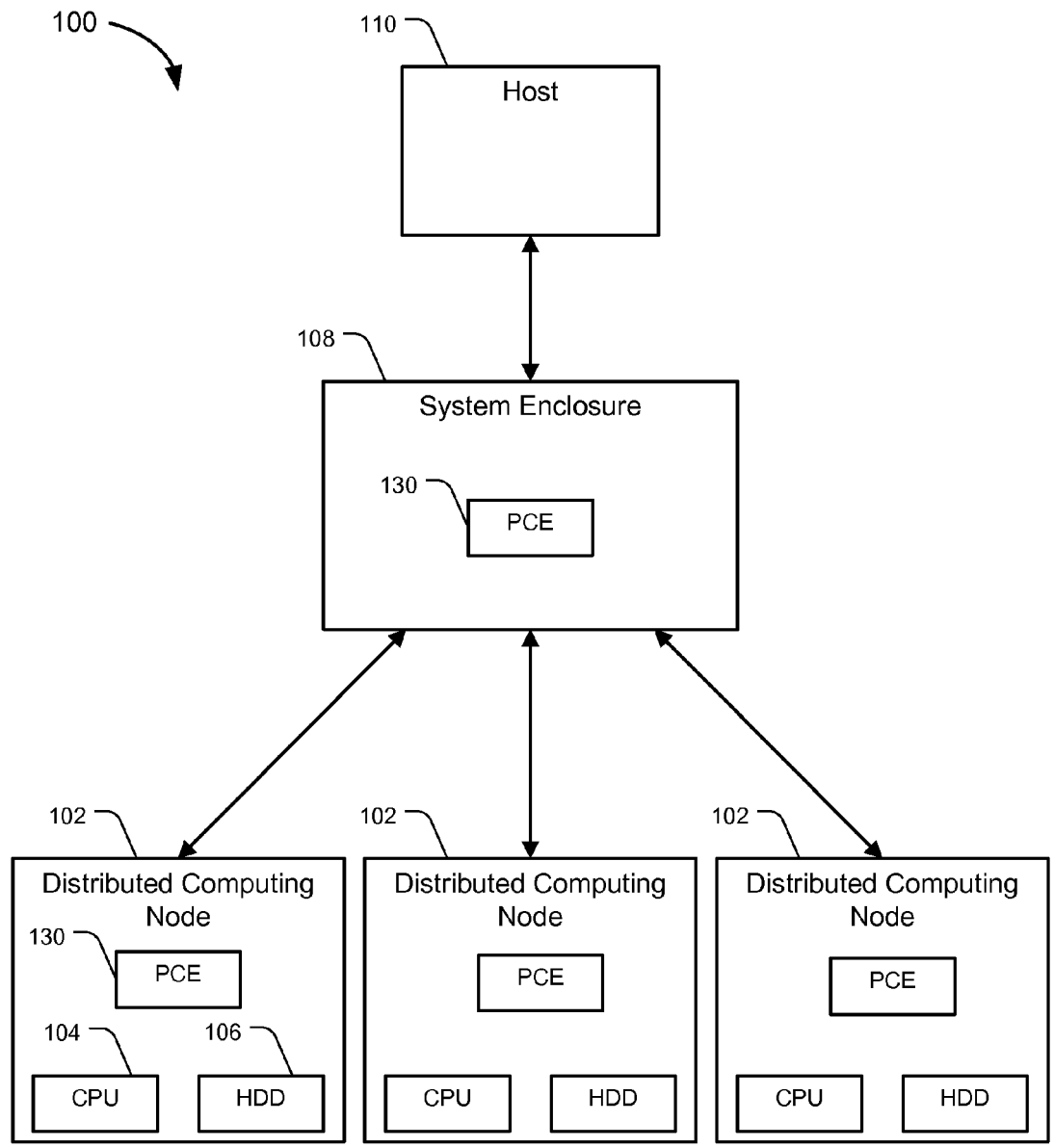
FIG. 1 is a diagram of an illustrative embodiment of a system for distributed power delivery.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

The amount of power required by computing devices, such as a server, can vary greatly over time. Some of this variation can relate directly to components whose power requirements increase as their utilization level increases. For example, a heavily loaded microprocessor may consume more power than an idle one. Other variation may come from more temporary causes, such as a hard disk drive spinning up. This variation can be particularly challenging for large distributed computing systems, such as server clusters comprised of multiple servers with varying power requirements.

In certain classes of server clusters, for example large-scale distributed computing clusters that operate simultaneously on several heterogeneous workloads, the peak theoretical active power requirements of the cluster may be substantially higher than the common active power requirement.

One approach to ensuring adequate power delivery can be to design the power delivery infrastructure in excess of the peak possible power requirements to ensure adequate supply is always available. This may solve the problem of ensuring adequate power delivery, but may require a high power infrastructure cost.

Another approach may relate to temporary causes of power demand, such as the spinning up of a hard disk drive. For example, a method with hard disk drives may be to stagger the spin-up of multiple drives to avoid a power scenario where all drives spin up at once. The drawbacks of this method may include longer time-to-ready of the devices needing power, and consequently more limited options for saving power (by spinning down a disk, for example) without incurring a system performance penalty.

Yet another approach may use distributed power delivery in a computing system, for example by employing a power control hierarchy. A distributed power delivery control system could utilize knowledge about the maximum power capacity of each sub-component of a computing system cluster, knowledge about real-time power needs of components in the system, and knowledge about priority of the power needs of components of the system to determine a system-level solution for power control in the system that minimizes power infrastructure costs and while minimizing negative performance impacts. In other words, a system of distributed power delivery may utilize information on a maximum theoretical power capacity of each subcomponent, the actual current power needed, and priorities of the current power needs.

The hierarchy could be comprised of power control entities (PCEs), which may also be referred to as control entities, power control circuits, power control processors, or similar permutations. A PCE may be implemented as circuits, such as reduced or complex instruction set computers (RISC or CISC), field programmable gate arrays (FPGAs), application-specific integrated circuit (ASIC), or other device. A PCE could also be a processor, controller, or other device executing software instructions for a PCE. Each PCE in the hierarchy may control power distribution or power management to lower PCEs or components in the hierarchy, or request power from higher PCEs or components in the hierarchy. For example, a PCE could be a specific device or circuit for implementing the tasks of a PCE, or a PCE could be an existing server, computer, or other device or component that can also act as a PCE, for example by executing software instructions.

Knowledge about maximum power capacity can include knowledge about the maximum potential power a component may require or be capable of supplying. For example, with a hierarchy of power control entities (PCEs), maximum required power may include the power necessary to run a component or all lower power control entities at maximum capacity. For supplying power, one entity may control power distribution to the entities below it in the hierarchy. An individual server may be able to supply at most one level of power to its subcomponents, whereas the rack that multiple servers are connected to may be able to supply another level of power, which may be different than the sum of the power capacities of all servers in the rack.

Turning now to FIG. 1, a diagram of an example system for distributed power delivery is shown and generally designated 100. The system 100 may include one or more distributed computing nodes 102. Each distributed computing node 102 may include a PCE 130, as well as one or more components with power requirements. For example, a distributed computing node 102 may include one or more circuits, processors, controllers, programmable gate arrays, or other devices for performing calculations and processing commands, such as the central processing unit (CPU) 104. A distributed computing node 102 may also include one or more volatile or non-volatile memory devices such as a hard disc drive 106, a dynamic random access memory (DRAM), solid state non-volatile flash memory, other kinds of memory, or any combination thereof. In embodiments with a PCE 130 for each distributed computing node 102, the PCE may control power distribution to the CPU 104 and the disc drive 106. For example, the disc drive 106 may have a pending task that will draw 50 W of power, and the PCE 130 may manage whether or not the disc drive may proceed with the task. In some embodiments the distributed computing nodes 102 may not contain a PCE 130, and power distribution to the components of the distributed computing nodes may be handled by a PCE at a higher level.

The system 100 may further include one or more system enclosures 108, which system enclosures 108 may include the one or more distributed computing nodes 102 and PCE 130. In some embodiments, the system enclosure 108 may be a data storage device (DSD) with one or more distributed computing nodes 102 in the form of hard discs, CPUs, or other components with power requirements. A DSD may have multiple computing nodes, allowing the DSD to handle multiple commands simultaneously. In another embodiment, a system enclosure 108 may be a redundant array of independent discs (RAID) device containing a plurality of hard drives devices. The PCE 130 of the system enclosure 108 may control distribution of power to the distributed computing nodes 108. It should be noted that while system enclosure 108 may refer to a casing or housing for the distributed computing nodes 102, the PCE 130 of the system enclosure 108 may be a CPU, circuit, or other device within the enclosure 108 for managing the nodes. For simplicity of explanation, tasks may be described as being performed by the "system enclosure" 108 or similar hierarchy level (e.g. server rack, server room), when the tasks are actually performed by a PCE at the given hierarchy level and not the enclosure, rack, room, etc. itself.

The system 100 may further include a host device 110. The host 110 may also be referred to as the host system or host computer. The host 110 can be a desktop computer, a laptop computer, a server, a tablet computer, a telephone, a music player, another electronic device, or any combination thereof. The host 110 and system enclosure 108 may be connected by way of a wired or wireless connection, or by a local area network (LAN) or wide area network (WAN). In some embodiments, the system enclosure 108 can be a stand-alone device not connected to a host 110, or the host 110 and system enclosure 108 may both be part of a single unit.

In the embodiment of FIG. 1, the host 110 may issue one or more commands to the system enclosure 108. The commands may be based on user input to the host 110, or they may be generated independent of user action. The system enclosure 108 may have circuitry (not shown) configured to receive the command and forward the commands for processing to one or more of the distributed computing nodes 102. The distributed computing nodes 102 (e.g. at the PCEs 130) may monitor the power requirements of component parts such as the CPU 104 or the HDD 106. In the system 100, a power distribution control hierarchy may exist, with components like the CPU 104 and HDD 106 requesting power from the PCE 130 at the distributed computing node 102 level, and the distributed computing node PCEs requesting power from the PCE at the system enclosure 108 level.

Figure 2:
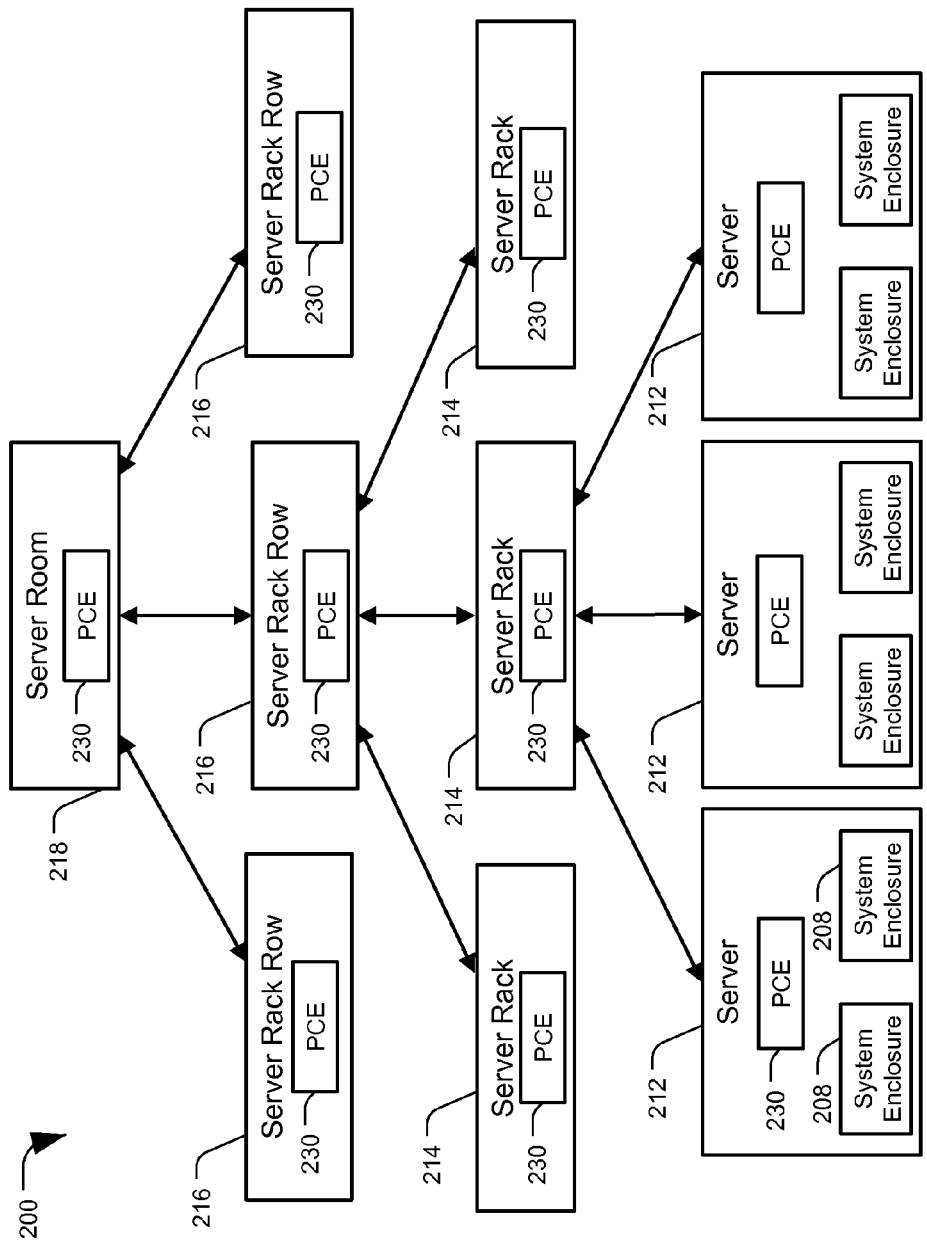
FIG. 2 is a diagram of an another illustrative embodiment of a system for distributed power delivery control.

Turning now to FIG. 2, another example of a system for distributed power delivery is shown and generally designated 200. The embodiment of system 200 may be a more extensive distributed computing environment than depicted in FIG. 1, such as a data center with a plurality of connected computing devices. The system 200 may include one or more system enclosures 208, similar to the system enclosures 108 of FIG. 1. The system enclosures 208 may be included in a server 212. The server 212 may include a device, such as PCE 230, which can manage power workloads on one or more included devices, such as the system enclosures 208. In some embodiments, each server 212 may be more analogous to the system enclosure 108 of FIG. 1, with the system enclosures 208 being more analogous to the distributed computing nodes 102 of FIG. 1. Other configurations of computing devices are also possible. The system 200 may also include one or more server racks 214, with each rack 214 containing one or more servers 212. A server rack 214 may be a cabinet or other frame enclosure for holding a plurality of equipment modules, such as servers 212. The system 200 may further comprise one or more server rack rows 216, each row 216 containing one or more server racks 214. For example, a line of server racks 214 in the form of cabinets may be lined up along one wall with a shared power source for the entire server rack row 216. The system 200 may further include a server room 218, with multiple server rack rows 216.

In some embodiments, a PCE could manage the power usage of one or more devices. For example, power management to a device could be based on available power. In an example embodiment, a PCE could manage the power usage of a single component based on whether a device was running on battery power, with high power operations being restricted.

System 200 may be understood as depicting an abstraction of a distributed power delivery system hierarchy, with the depicted elements representing "levels" of the hierarchy. The actual distributed power delivery may be controlled by power control entities 230, with a power control entity at each depicted element of system 200. It should be understood that a power control entity may be a component or device separate from the elements depicted in FIGS. 1-2 (e.g., separate from the system enclosures, servers, server racks, server rooms, etc.), with the depicted elements used to provide a level of abstraction to understand how the hierarchy may be configured. Power control entities 230 may be computing devices, circuits, reduced instruction set computing (RISC) chips, transformers, or other devices. In some embodiments, PCEs at different levels of the hierarchy, or each PCE in the hierarchy, could be a different type of device or circuit. For example, a processor of a server could execute software for implementing the PCE, and at another level a server rack could have a dedicated circuit or device for executing the functions of a PCE. In a complete system, each level of hierarchy may be implemented differently as well depending upon what is practical for a given level.

As used in this disclosure, requests and commands sent to or from a control entity 230, or decisions made by a control entity, may refer to one of these devices at the appropriate hierarchy level, and not to an actual server rack, server room, etc. For example, control entities 230 may be computers, where a computer may control the delivery of power to all the servers on a given server rack, and a separate computer may control the delivery of power to all the server racks, etc. In another example, a single computer may control the power delivery of the entire hierarchy, with different modules operating in the computer acting as power control entities, controlling the power for each level or element. However, in some embodiments the power control entities 230 may be incorporated into the depicted elements, or the functions of the power control entity may be performed by the depicted item itself, such as by computing nodes, servers, etc. For example, a data storage device may have multiple hard disc drives and CPUs, with a power control circuit operating in the data storage device to handle power distribution to the various CPUs and HDDs. For the sake of simplicity, the power control entities 230 may be referred to by their abstract elements, such as 'server room' or 'system enclosure.'

In some embodiments, a distributed computing system such as depicted in FIG. 2 may be used to service requests from a large number of host or user devices. For example, a server room 218 may service requests for computers in an office building, or for any number of accesses to websites hosted on the servers 212. In some embodiments, the system 200 may be used for processing of big data for market research, scientific analysis, or other applications.

Each component of the system 200, such as system enclosures 208, servers 212, server racks 214, server rack rows 216, and server room 218, may have or be power control entities 230. Each power control entity may have circuitry or logical instructions for managing power distribution, particularly for entities and components farther down the distributed power control hierarchy. For example, the server room 218 may control an ultimate available power load, which it allocates among the server rack rows 216. Each server rack row 216 may further allocate its share of the total power load to server racks 214 in that server rack row 216. This distributed power control scheme may continue down the hierarchy tree to distributed computing nodes 102 of the system enclosures 208, which computing nodes 102 may allocate power among their components such as the CPU 104 and the HDD 106. Additionally, each power control entity may request additional power from the next higher power control entity up to the entity which controls the total power supply, such as the server room 218.

Figure 3:
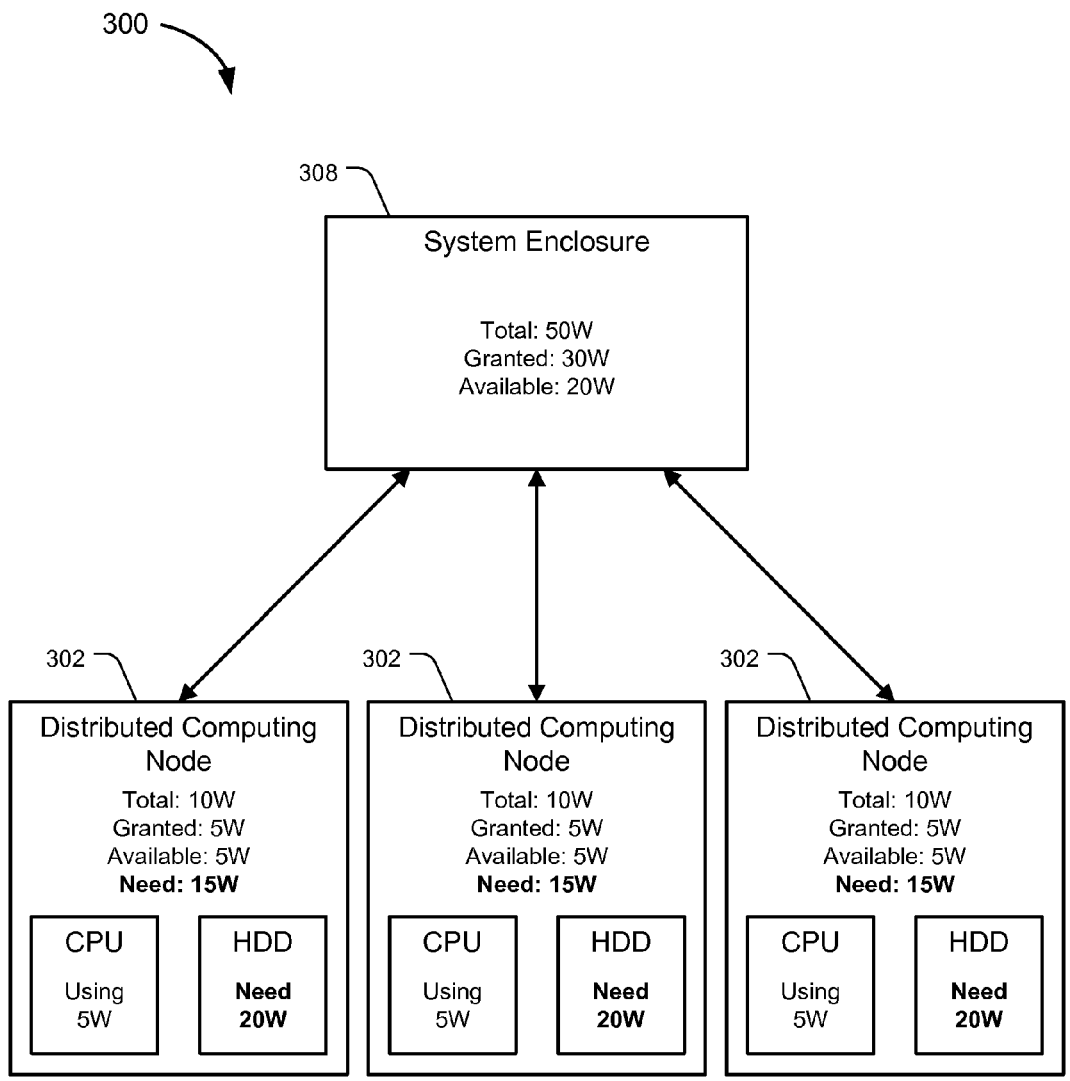
FIG. 3 is a diagram of an another illustrative embodiment of a system for distributed power delivery.

Turning now to FIG. 3, a diagram of an example system for distributed power delivery is shown and generally designated 300. System 300 could be the system of FIG. 1 with a system enclosure 308 containing a power control entity for overseeing power distribution to distributed computing nodes 302. In this example, each distributed computing node can contain a CPU and an HDD. More specifically, the illustrative embodiment of system 300 comprises two levels of power control entities, with one level comprising the distributed computing nodes 302 and the next higher level comprising the system enclosure 308.

System 300 provides an overview of an example distributed power delivery hierarchy of the present disclosure. The example embodiment of FIG. 2 displays a possible initial power control entity state. That is, the system enclosure 308 may have a base total amount of power of 50 W allocated to it, and it may default to assigning 10 W of power to each of the three distributed computing nodes 302, while keeping 20 W of power in reserve for allocation. The distributed computing nodes 302 may have allocated 5W of power to CPUs of the computing nodes, and may have retained 5W of power for allocation. In the depicted embodiments, each power control entity may actually receive additional power which is used to run power distribution control processors or controllers for determining how to allocate power, but for the sake of simplicity such additional power and control elements are not depicted. It should also be understood that "allocating" power to a lower-level entity may be implemented by limiting the amount of power the lower-level entity is permitted to draw. In other words, a higher-level entity may send instructions to a lower-level entity that the lower-level entity may not draw more than a set amount of power, or may limit the operations of the lower-level device so as to limit the amount of power the lower-level device requires. Other implementations are also possible.

In an illustrative embodiment, each HDD of the computing nodes 302 in the system may be attempting to spin up, which could require a total of 20 W of power. Each HDD may communicate this request to the parent power control entity; in this case, the distributed computing nodes 302. Each of the distributed computing node 302 power control entities in this example may have already granted 5W of power to the processing sub-system CPU, may have 5 W left in its currently allocated power budget, and may require an additional 15 W of power budget to service the HDD's request for additional power. The distributed computing nodes 302 may each send a power request to the system enclosure 308 power control entity requesting an additional 15 W of power.

The system enclosure 308 power control entity may have only 20 W remaining to grant of its power budget, so it may not be able to simultaneously service all 45 W of power being requested. The system enclosure 308 may choose one of the requests to service first, based on a request message priority or other heuristic, and may grant the 15 W requested to the chosen distributed computing node's power control entity. The distributed computing node's 302 power control entity, in turn, may grant the 20 W requested by the HDD which then can spin up. The new power state of the system 300 is shown in FIG. 4.

Figure 4:
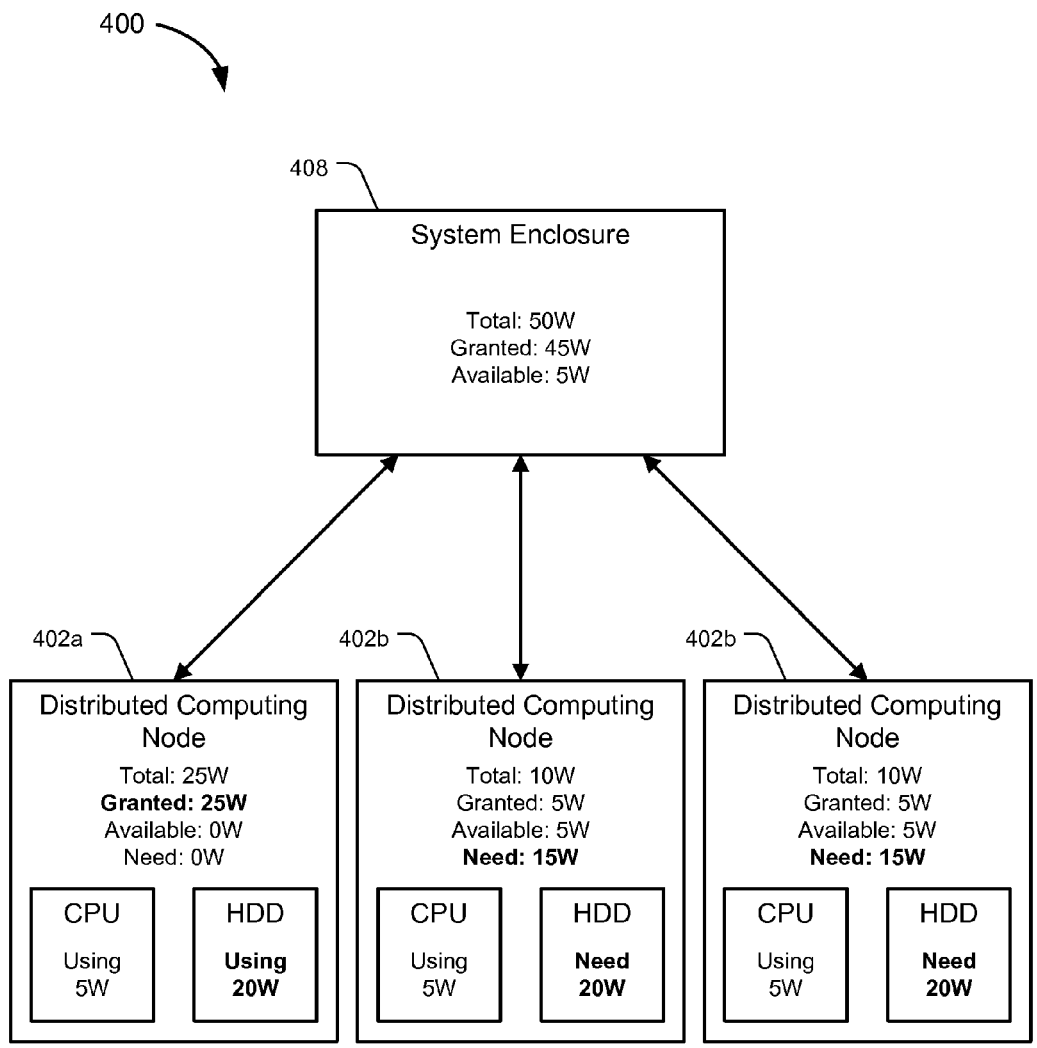
FIG. 4 is a diagram of an another illustrative embodiment of a system for distributed power delivery.

FIG. 4 displays a diagram of the system for distributed power delivery of FIG. 3 after reallocating power, generally designated 400. In system 400, the system enclosure 408 may have allocated 45 W of its 50 W budget, with 25 W allocated to the chosen distributed computing node 402a, and 10 W each to the other two nodes 402b. The chosen distributed computing node 402a may have allocated 5 W to the CPU and 20 W to spin up the HDD.

Upon completing the spin-up, the HDD of the chosen distributed computing node 402a can relinquish its power budget by sending a power usage complete message to the distributed computing node 402a power control entity, which in turn can relinquish its spare usage to the system enclosure 408 power control entity. For example, the distributed computing node 402a may retain its original power budget of 10 W, and use 5 W to run the CPU and 5 W to continue operation of the HDD. The system enclosure 408 power control entity may then be free to choose the next highest priority requester to service among the remaining distributed computing nodes 402b.

In some embodiments it may be possible to have all power removed from an entity, while in others there may be some minimum amount of power that can never be removed. It may depend on various factors such as how the power control entities are implemented, the type or types of devices the power control entities manage, and the "wake up" time following a complete power removal to an entity.

For example, in the embodiments of FIGS. 3 and 4, the system enclosure 308 has 50 W of total available power, and each distributed computing node 302 requires 25 W to spin up an HDD. It may be possible for the system enclosure 308 to issue a power relinquishment request for all power to one of the three distributed computing nodes 302, which may require a complete cessation of operations on that node. The system enclosure 308 would then be able to allocate 25 W to each of the other two distributed computing nodes, allowing them both to spin up their HDDs simultaneously. After the HDDs finish spinning up, the system enclosure 308 may then redirect power to the third distributed computing node to resume operations and spin up the HDD.

In an embodiment where the power control entity for an individual server may be implemented as a processor running a software thread that communicates requests or responses to the next higher power control entity level over TCP/IP. In this embodiment it may be difficult to remove power from the server completely as the power control entity itself may be dependent upon some basic level of operation of the server to function. So there may be some minimal amount of power that is always required or could never be revoked.

In another example embodiment, the power control entity for a server may be implemented as a hardware device physically present inside the server chassis. This may comprise an embedded processor that communicates to its parent power control entity over a side-band interface (such as I2C) and may be operably in communication with the server hardware through another interface (for example a serial port). The PCE may have control over the state of the server's power supply with the ability to shut the power supply on and off. In this case it may be possible to completely remove power. However, it may not be desirable in the system as removing power completely and later restoring may entail shutting down the server's operating system and later restarting it. This can be a lengthy operation that may not be desirable in the system. This may be even more pronounced in an embodiment where a PCE may control the distribution of power to an entire server rack. Revoking all power to the PCE may require shutting down all servers on the server rack, and the shut down and subsequent restart may be prohibitively time and resource intensive.

Finally consider an embodiment where the PCE is again implemented as a distinct hardware device, but the hardware that it is managing is a disk drive. In this case it may again be possible to completely remove power from the disk drive. This time it may be more likely that doing so could be desirable from a system point of view as the shutdown and startup penalty of a disk drive is substantially less than that of an entire server.

Returning to FIG. 4, in some embodiments there may be power control entities above the system enclosure 408 in a distributed power delivery control system (e.g., a server or server rack of FIG. 2). In such embodiments, the system enclosure 408 may request additional power from the next higher power control entity to allocate to the distributed computing nodes 402 so that more than one node may be able to spin up an HDD at the same time.

Figure 5:
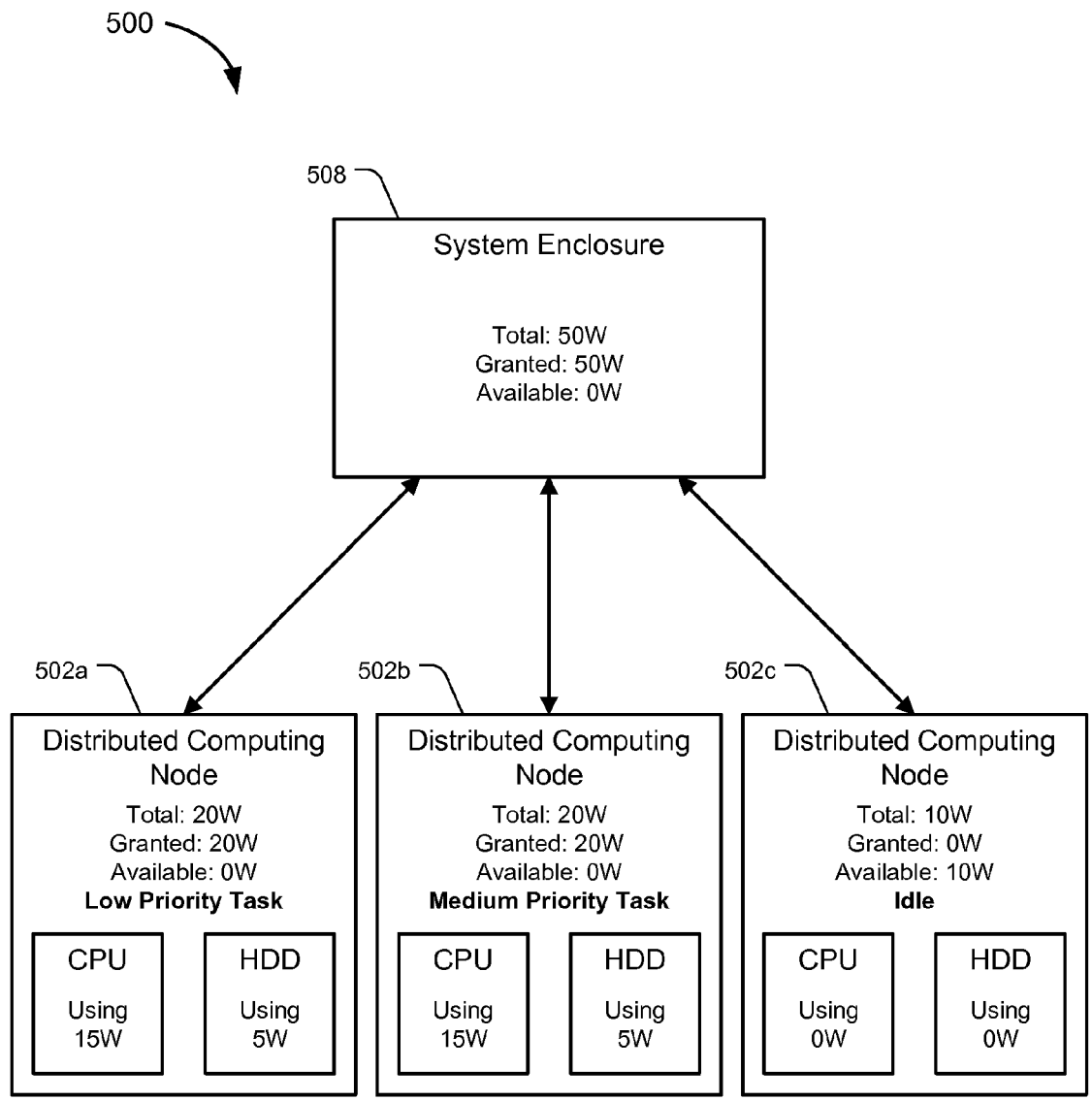
FIG. 5 is a diagram of an another illustrative embodiment of a system for distributed power delivery.

Turning to FIG. 5, a diagram of an illustrative embodiment of a system for distributed power delivery is shown and generally designated 500. The system 500 may utilize the same setup as the systems of FIGS. 3-4, comprising a system enclosure 508 containing three computing nodes 502, each including a processing subsystem (CPU) and hard disc drive (HDD).

In this example, two of the three distributed computing nodes, 502a and 502b, may be actively executing workload tasks, while the third node, 502c, may be idle. Of the two tasks, one may be low priority, while the other may be considered to have medium priority. Priority may be based on numerous factors (e.g. based on user input, time to complete a task, etc.), and for example may refer to temporal priority or functional priority. Temporal priority may refer to where a first received task has higher priority than a later-received task, and tasks may be handled in the order they are received. Functional priority may refer to an "importance level" of a task. For example, a user may designate the priority of a task, or tasks originating from user-controlled applications may automatically be assigned higher priority than other system tasks. A system may generate information used to assign priority levels, such as based on the nature of a task. For example, background operations such as scans or diagnositcs may be given a low priority. In some embodiments, multiple forms of priority may be used. For example, two tasks of equal functional priority may be received, in which case a system may execute the first received task before the second received task.

Continuing with the example of system 500, while the two tasks of distributed computing nodes 502a and 502b are executing, a high-priority task may be sent to the distributed computing cluster for execution that will require 20 W on an idle node. A distributed computing cluster may include other system enclosures and distributed computing nodes in addition to those depicted in FIG. 5. An idle distributed computing node 502c may be available in the cluster of system 500, so the high-priority task may be issued to that node. The associated distributed computing node 502c may then make a request for the power needed to execute the new task. For example, node 502c may require 15 W of power for the CPU and 5 W of power for the HDD to execute the task, and therefore requires 10 W of power above the 10 W it already has available.

The system enclosure power control entity 508 may not have sufficient available power and be unable to grant the requested power to the high-priority task, and therefore may decide to issue a power revocation request to the node 502a executing the low priority task. A power revocation may leave the node 502a executing the low priority task with less than the 20 W power budget that it had requested. The new power state is displayed in system 600 of FIG. 6.

Power control revocation requests may not only be initiated from events such as needing to execute a higher priority task, but may also originate from system-level events that change the available power budget of a power control entity. For example, a loss of power which leads to the system running on a battery back-up system could cause revocation requests to be generated and sent to power control entities that were previously granted power. In some embodiments, power revocation requests may result in the subcomponent relinquishing power as soon as a running process is finished or is at a point where work can be stopped or downscaled without losing work. In other embodiments, a power revocation command may require that a subcomponent relinquish the power immediately, regardless of where the subcomponent is in its current task.

Figure 6:
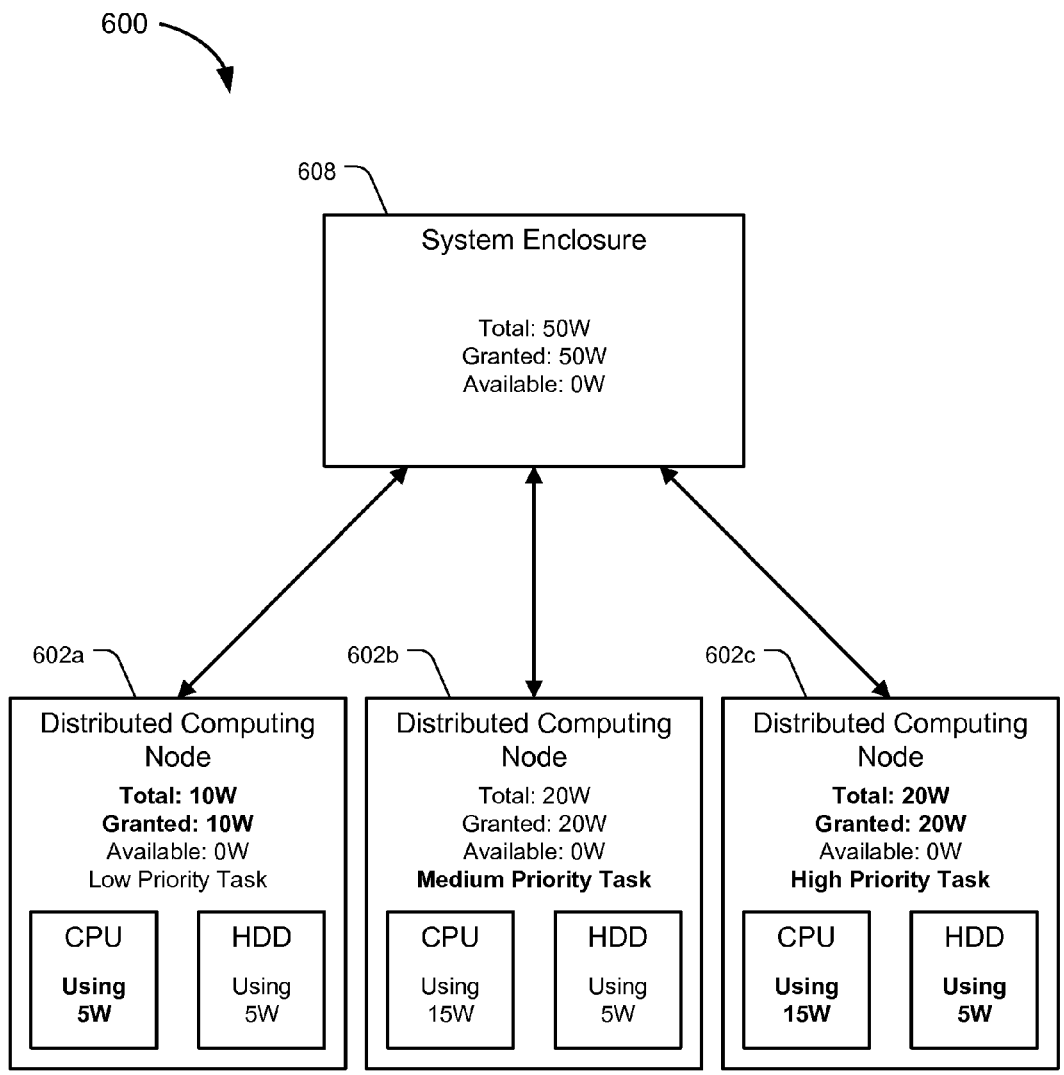
FIG. 6 is a diagram of an another illustrative embodiment of a system for distributed power delivery.

FIG. 6 shows that the distributed computing node 602a with the low-priority task may be reduced from 20 W to 10 W of power, and may need to cut back the power assigned to the CPU from 15 W to 5 W. With 10 W of power budget remaining, the node 602*a* executing the low priority task may continue to work on the low priority task, but at a lower level of performance (for example by reducing CPU clock frequency or by utilizing fewer CPU cores). Meanwhile, the node 602*c* with the high priority task can be granted the 10 W revoked from node 602*a*, and therefore may now have 20 W. Node 602*c* may assign 15 W to the CPU and 5 W to the HDD, and may be able to work on the high priority task at peak performance. In this way, power can be intelligently managed in the system 600 with minimal performance impact.

In some embodiments, power requests may include a priority of the associated task. Priority may be expressed as categories (e.g. high, medium, and low), as a numerical representation (e.g. 1-100), or by other methods. For example, a distributed computing node could issue a high-priority power request for 10 W to the parent PCE at a system enclosure. If the system enclosure lacks the power to grant, it may determine if other lower-priority tasks are executing on other distributed computing nodes, and issue power revocation requests. In this embodiment, all other tasks may be of equal or higher priority, or the executing tasks may not be stopped. The system enclosure may opt to wait for other tasks to finish, or it may issue a power request for 10 W and a high-priority designation to a parent PCE, such as at a server level.

It may be beneficial to transmit to a higher level power control entity high priority requests that cannot be processed from the current power budget, as those requests are more likely to have a time-criticality to their being serviced. For lower priority requests, it may be beneficial to wait to see if, over some period of time, the requests can be serviced from the local power budget so as to not overburden upper-level power control entities with many requests. If after some period of time requests haven't been serviced, the power control entity may choose to request additional power for a task or bundle a number of outstanding requests into one request for additional power to the next higher level power control entity.

In one example, a system enclosure PCE may have several power requests pending that it is unable to service with its current power supply, and these requests may have different associated priorities (e.g. one low, one medium, and one high). The system enclosure may issue one or more power requests to a higher-level PCE. In some examples, the system enclosure PCE may compute a joint priority value to assign to the request. In one embodiment, the PCE may compute an "average" of outstanding requests and communicate that as the joint priority, such as using a median or mean value. For example, priority for each task may be an integer between 1 and 100, and the priorities can be averaged, such as a weighted average based on the requested power for each task. In another embodiment, the PCE request may contain information about the distribution of the individual requests. For example, it might communicate that there are 10 low priority, 5 medium priority, and 1 high priority requests. Further, the requested power for each group similarly might be broken out.

In other embodiments, the PCE may issue a power request based on each individual request, such as by directly forwarding power requests received from the lower entities. In some embodiments, power requests may involve a combination of both combined and separate power requests. For example, one power request may combine high-priority requests, one request may combine medium-priority requests, etc.

Messages, communications, and commands exchanged between components can be transmitted by wired or wireless channels, utilizing either in-band existing communication paths already present in a system (for example an Ethernet connection), or using out-of-band communications paths added to the system for the distributed power delivery control communications. The message passing mechanism used at various levels of a power control entity hierarchy need not be homogeneous. A system may contain a mix of in-band and out-of-band communication paths, matching the needs of a particular level of control hierarchy.

Power control entities in a distributed power delivery system may be modular. For example, the system enclosure of FIGS. 1-6 with its distributed computing nodes could be used as a stand-alone device, or it could be added to a larger distributed computing system such as depicted in FIG. 2. Behavior of the power control entities of a distributed power delivery system can be largely homogenous, with it being relatively irrelevant whether sub-devices of any given power control entity are actual end-devices such as CPUs or HDDs, or whether they are other power control entities lower on the hierarchy. Power control entities may need to know only the amount and priority of power needs of lower power-requesting components, and whether there are any higher components from which power can be requested. For example, a "server rack" 214 PCE of FIG. 2 may actually control power distribution to several servers 212 as well as directly to several system enclosures 208. In other words, the configuration of a power distribution hierarchy need not be homogenous, and may involve placing the same type of entity at different levels of the hierarchy.

As the size of a power control entity hierarchy grows, the latency of power request messages being handled may become a factor in system-level performance. To help ensure fast request handling latency, power control entities at various levels of hierarchy may be allowed to maintain a pool of spare power which can be used for quickly handling high-priority requests. For example, a PCE may have a "standard power supply" total, and an additional power supply that is only allocated to high-priority tasks.

A power control request may contain both a maximum power level requested, and a minimum power level requested. For example, in cases where the maximum power level requested cannot be serviced, a lesser amount, such as no less than the minimum, can be granted. An example of a maximum power level might be the power that it takes to fully load 4 cores of a quad-core microprocessor, while the corresponding minimum might be the power it takes to load only one of the cores. This may allow much greater flexibility in power distribution above simply supplying or not supplying a single requested power level to a component. In some embodiments, a power control entity may request additional power from a higher power control entity or issue a power revocation request to a lower-priority task to satisfy the maximum power request. If those avenues are not successful, power requests or revocations can be attempted for the minimum requested power.

In another example, a PCE may have two current power requests with equal priority, without enough power to service both at maximum. Instead, it may provide the minimum power to each rather than not servicing one in favor of the other. In another embodiment, a medium-priority task may already be running at maximum power, and a new medium priority request is received that cannot be serviced at even minimum power. A PCE may issue a power revocation request to the first task to reduce the first task to running below maximum power so that the second request can receive power at the same time. Other examples of power balancing based on priority levels and requested power ranges are also possible.

The examples provided here to not mean to limit the application of this invention to CPUs and HDDs. All system components, especially those that utilize varying amounts of power over time, can take advantage of a distributed power delivery system. For example, solid state drives (SSDs) can have the ability to operate at different power and performance levels. In a high-performance, high-power usage, a solid state drive may allow many different NAND flash die to be active at the same time. If less power were available, or if lower performance were needed, fewer NAND flash die could be made active in parallel. The SSD could communicate its varying power and performance needs according to this system. The same concept could apply to other system components such Ethernet or storage switches.

Figure 7:
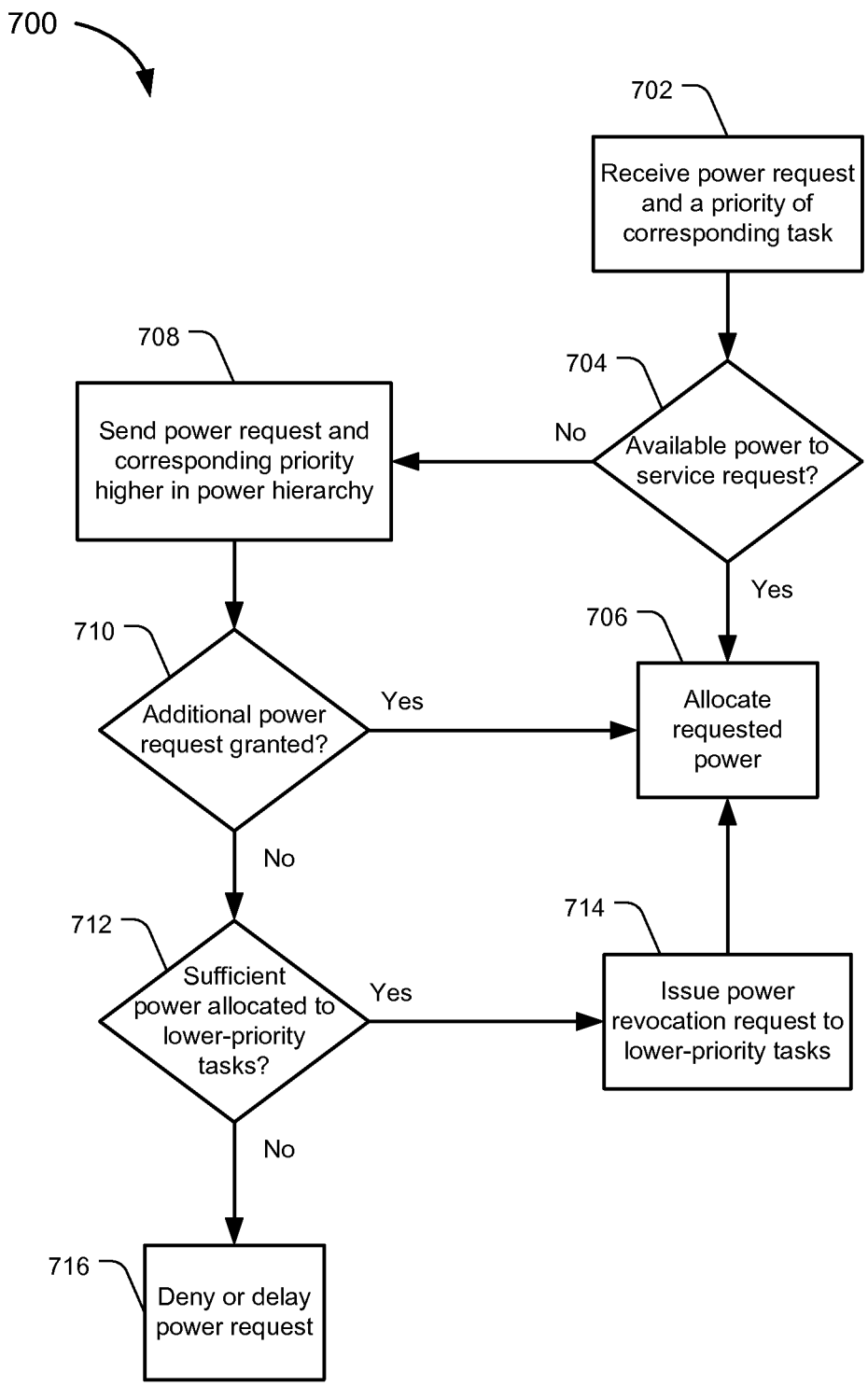
FIG. 7 is a flowchart of an illustrative embodiment of a method for distributed power delivery.

Turning now to FIG. 7, a flowchart of an example embodiment of a method for distributed power delivery is depicted and generally designated 700. The depicted method 700 may be performed by any given power control entity in a system for distributed power delivery, such as the power control entities of FIGS. 1-6.

The method 700 may involve receiving at a power control entity a power request and a priority for a task associated with the requested power, at 702. A determination may be made as to whether the power control entity has sufficient power available for allocating to service the power request, at 704. A determination of whether sufficient power is available may involve determining whether the requested power may become available as other tasks complete. For example, a PCE may opt to wait for a period of time to see if power becomes available. In some embodiments, a PCE may opt to seek additional power without waiting. If sufficient power is available, the requested power can be allocated, at 706.

If sufficient power is not available at 704, or if power did not become available in the period of time, the method 700 may involve sending a power request and corresponding priority to a higher element in the distributed power delivery hierarchy, at 708. This may involve forwarding to the power request received at 702, or it may involve determining what additional power is needed. For example, if the power control entity has 10 W of power available, and the power request received at 702 is for 15 W of power, the power request submitted at 708 may be for the additional 5 W of power needed to satisfy the request of 702. In embodiments where the power control entity executing the method 700 is a top element on the power control hierarchy, there may be no higher elements to request power from, and this step may not be performed, or may return an automatic denial.

The method 700 may next involve determining whether the additional power request of 708 was granted, at 710. For example, the higher power control entity may have provided the power, it may have denied the request if no power was available and no lower-priority task was available from which to obtain the requested power, or the request may have timed out with no response. If the requested power was supplied at 710, the method 700 may involve allocating the power requested in step 702, at 706.

If the power request was denied at 710, the method 700 may involve determining whether sufficient power to satisfy the request of 702 is allocated to a lower-priority task, at 712. If there is a lower-priority task, the method 700 may involve issuing a power revocation request to the lower-priority task, at 714. For example, the power control entity may maintain a list of currently executing tasks and their priority, and it may determine where to send a power revocation command based on the list. In another embodiment, a power control entity may issue power revocation commands and the priority of the power request from 702 to some or all of the currently executing tasks. In such embodiment, the executing devices may compare the priority of the power request to the priority of the executing tasks, and either relinquish power if the priority of the request is higher, or send a denial if the priority of the request is equal to or lower than the currently executing task. Other embodiments are also possible. In some embodiments, the PCE or executing devices may also maintain a minimum required power for currently executing tasks, and a power revocation request may only revoke power in excess of the minimum required power. Once power has been relinquished, the newly relinquished power may be allocated according to the power request of 702, at 706.

If sufficient power to satisfy the power request is not available from lower-priority tasks, at 712, the method 700 may involve denying or delaying the power request, at 716. For example, a power control entity may deny the power request, and the requesting node may resubmit the request at intervals. In some embodiments, the requesting node may pass a message up the computing system indicating that it is not capable of performing the task, at which point the task may be assigned to a different node. In other embodiments, the power control entity may maintain a list or queue of pending power requests, and may service them according to priority as power becomes available, for example from tasks completing in the computing system.

The depicted embodiment of FIG. 7 is just one possible method of distributed power delivery. In other embodiments, steps may be performed in another order, such as by attempting to issue power revocation requests prior to issuing a power request higher in the hierarchy. Steps may be added or removed without departing from the scope of the present disclosure. For example, additional power requests may be received, and a PCE may combine or prioritize the requests when issuing additional power requests, power revocation requests, or when distributing power.

Figure 8:
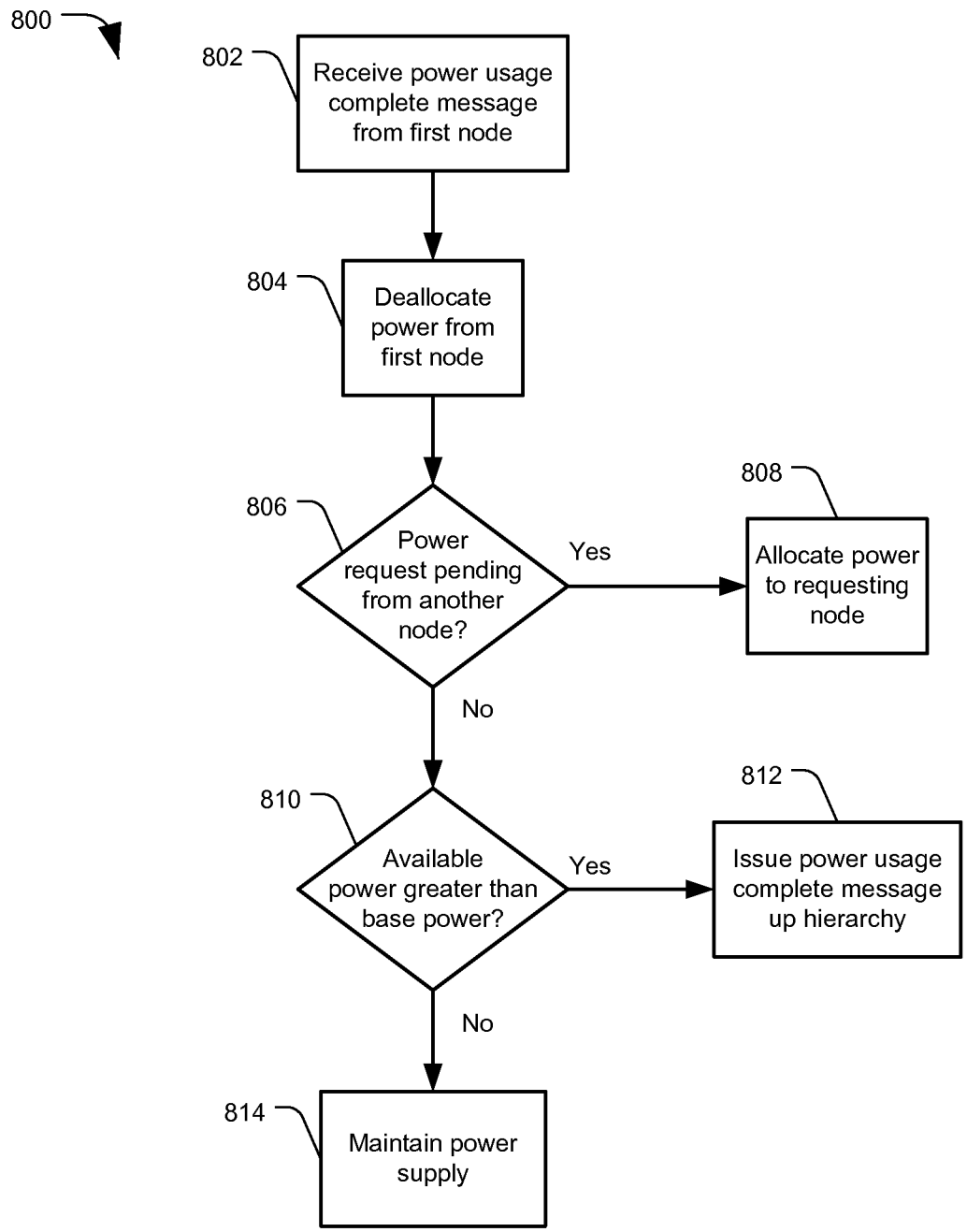
FIG. 8 is another flowchart of an illustrative embodiment of a method for distributed power delivery.

Turning now to FIG. 8, a flowchart of another example embodiment of a method for distributed power delivery is depicted and generally designated 800. The depicted method 800 may be performed by any given power control entity in a system for distributed power delivery, such as the power control entities of FIGS. 1-6.

The method 800 may involve receiving a power usage complete message from a lower component, referred to herein as a first node, at 802. It should be understood that the first node may not be an end component such as the distributed computing nodes, CPUs, or HDDs depicted in FIG. 1, and could also be a lower intermediary power control entity. The method 800 may next involve deallocating power from the first node, at 804.

The method 800 may next involve determining whether a power request is pending from another node, at 806. If so, the method 800 may involve allocating the requested power to the requesting node, at 808. If no power request is pending, at 806, the method 800 may next involve determining if the power supply now available after the deallocation at 804 is greater than a base power for the power control entity, at 810.

For example, each component in a distributed power delivery control system may have a default or base power level that is supplied to the component in a base state. This base level of power may be a minimum required for an idle state of the component and its lower dependencies, it may be a medium amount of power that can be used for performing some given level of operations without requiring power requests to be submitted up the hierarchy, or some other established level. In some embodiments, the base power level is the minimum supplied to the component and will not fall below that level even with a power revocation request. In other embodiments, the base level may be reduced if the power is required elsewhere in the system.

If the available power is greater than the base power, at 810, the method 800 may involve issuing a power usage complete message up the distributed power delivery control hierarchy, and having the excess power deallocated, at 812. If the available power is not greater than the base power level, 810, then the method 800 may involve maintaining the current available power supply, at 814.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
   a first processor configured to:
      receive a first request to allow a component to expend an amount of power;
      determine if the first request can be satisfied with an unallocated power budget managed by the first processor, the unallocated power budget being an unallocated portion of a total power budget available to and managed by the first processor;
      allow the component to expend the amount of power when the first request can be satisfied with the unallocated power budget; and
      when the first request cannot be satisfied with the unallocated power budget, issue a second request to a second processor that manages the total power budget available to the first processor, the second request including a request to increase the total power budget.

2. The device of claim 1 comprising the first processor further configured to receive a priority of a first task associated with the first request.

3. The device of claim 2 comprising the first processor further configured to:
   issue a power revocation request regarding a second task with a priority lower than the priority of the first task when the first request cannot be satisfied with the unallocated power budget.

4. The device of claim 2 comprising the first processor further configured to:
   receive a plurality of requests to allow components to expend power including the first request;
   receive a plurality of priority values corresponding to the plurality of requests; and
   apportion the unallocated power budget among the plurality of requests based on the plurality of priority values.

5. The device of claim 4 comprising the first processor further configured to:
   issue the second request when the plurality of requests cannot be satisfied with the unallocated power budget, the second request including a priority based on the plurality of priority values.

6. The device of claim 2 further comprising the priority of a task is based on an order received, user settings, time to complete, type of application initiating the task, or whether the task is a background operation.

7. The device of claim 1 comprising the first processor further configured to:
   determine whether the unallocated power budget becomes sufficient to satisfy the first request based on a task completing within a threshold time period; and
   issue the second request when the unallocated power budget does not become sufficient to satisfy the first request within the threshold time period.

8. The device of claim 1 comprising the first processor further configured to:
   receive a first message indicating that power associated with a first task is no longer required;
   deallocate power associated with the first task in response to the first message; and
   add the deallocated power to the unallocated power budget.

9. The device of claim 8 comprising the first processor further configured to:
   when deallocating the power associated with the first task results in the unallocated power budget being greater than a base power budget, issue a second message to the second processor indicating that power in excess of the base power budget is no longer required.

10. The device of claim 1 comprising the first processor further configured to:
    receive the first request including a maximum requested power and a minimum requested power;
    determine if the maximum requested power can be satisfied with the unallocated power budget;
    when the maximum requested power cannot be satisfied, issue the second request to increase the total power budget so that the unallocated power budget can satisfy the maximum requested power;
    when the second request is not satisfied, determine if the minimum requested power can be satisfied with the unallocated power budget; and when the minimum requested power cannot be satisfied, issue a third request to increase the total power budget so that the unallocated power budget can satisfy the minimum requested power.

11. The device of claim 10 comprising the first processor further configured to:
receive a priority of a first task associated with the first request;
determine whether a combined power budget including the unallocated power budget combined with power allocated to a second task with a priority lower than the priority of the first task is sufficient to satisfy the maximum power request;
determine whether the combined power budget is sufficient to satisfy the minimum power request when the combined power budget is not sufficient to satisfy the maximum power request; and
issue a power revocation request to the second task when the combined power budget is sufficient to satisfy the maximum power request or the minimum power request.

12. An apparatus comprising:
a device configured to control power to one or more power-consuming components, including:
receive a first request for power from a first component of the one or more power-consuming components, the first request including a maximum requested power and a minimum requested power;
allocate power to satisfy the maximum requested power when the maximum requested power can be satisfied from an unallocated power budget;
allocate power to satisfy the minimum requested power when the maximum requested power cannot be satisfied from the unallocated power budget; and
when the first request cannot be satisfied with the unallocated power budget, issue a second request to a processor that manages a total power budget available to the device, the second request including a request to increase the total power budget.

13. The apparatus of claim 12 comprising the device further configured to:
manage power usage among the one or more power-consuming components based on a priority of tasks associated with the one or more power-consuming components;
receive the first request including a first priority of a task associated with the first request, the first component configured to perform multiple tasks having different priorities;
when the first request cannot be satisfied from the unallocated power budget, determine if the first request can be satisfied from a combined power budget including the unallocated power budget combined with power allocated to a second component for a task having a second priority lower than the first priority; and
issue a command revoking power from the second component when the first request can be satisfied from the combined power budget.

14. The apparatus of claim 13 comprising the device further configured to:
when the maximum requested power cannot be satisfied with the unallocated power budget, issue the command if the combined power budget can satisfy the maximum requested power;
when the combined power budget cannot satisfy the maximum requested power, determine if the minimum requested power can be satisfied with the unallocated power budget; and
when the minimum requested power cannot be satisfied with the unallocated power budget, issue the command if the combined power budget can satisfy the minimum requested power.

15. The apparatus of claim 13 comprising device further configured to:
receive a message from the first component indicating power usage for an amount of power in excess of a base power budget of the first component is complete;
deallocate the amount of power in response to the message; and
add the amount of power to the unallocated power budget.

16. The apparatus of claim 13 comprising the device further configured to:
when the first request cannot be satisfied from the combined power budget, issue a second request to increase a total power budget to another device that manages power usage for the device.

17. The apparatus of claim 12 further comprising:
the one or more power consuming components include additional devices for managing power usage among additional components.

18. A non-transitory computer-readable storage medium storing instructions which cause a processor to perform a method comprising:
receiving a first request to allow a component to expend an amount of power;
receiving a priority of a first task associated with the first request, the component being configured to perform different tasks having different priority values;
determining if the first request can be satisfied with an unallocated power budget, the unallocated power budget being an unallocated portion of a total power budget available to the processor;
allowing the component to expend the amount of power when the first request can be satisfied with the unallocated power budget;
determining whether the unallocated power budget becomes sufficient to satisfy the first request based on a task completing within a threshold time period; and
issuing a second request to increase the total power budget when the unallocated power budget does not become sufficient to satisfy the first request within the threshold time period.

19. The computer-readable storage device of claim 18, the method further comprising:
issuing a power revocation request regarding a second task with a priority lower than the priority of the first task when the first request cannot be satisfied with the unallocated power budget.

20. The computer-readable storage device of claim 18, the method further comprising:
receiving a plurality of requests to allow components to expend power including the first request;
receiving a plurality of priority values corresponding to the plurality of requests; and
apportioning the unallocated power budget among the plurality of requests based on the plurality of priority values.

21. The computer-readable storage device of claim 18, the method further comprising:
receiving a first message indicating that power associated with a first task is no longer required;

deallocating power associated with the first task in response to the first message; and adding the deallocated power to the unallocated power budget.

22. The computer-readable storage device of claim 18, the method further comprising:

receiving the first request including a maximum requested power and a minimum requested power;

determining if the maximum requested power can be satisfied with the unallocated power budget;

when the maximum requested power cannot be satisfied, issuing a second request to increase the total power budget so that the unallocated power budget can satisfy the maximum requested power;

when the second request is not satisfied, determining if the minimum requested power can be satisfied with the unallocated power budget; and when the minimum requested power cannot be satisfied, issuing a third request to increase the total power budget so that the unallocated power budget can satisfy the minimum requested power.

23. The computer-readable storage device of claim 22, the method further comprising:

receiving a priority of a first task associated with the first request;

determining whether a combined power budget including the unallocated power budget combined with power allocated to a second task with a priority lower than the priority of the first task is sufficient to satisfy the maximum power request;

determining whether the combined power budget is sufficient to satisfy the minimum power request when the combined power budget is not sufficient to satisfy the maximum power request; and issuing a power revocation request to the second task when the combined power budget is sufficient to satisfy the maximum power request or the minimum power request.

24. The device of claim 1 further comprising:

the first processor includes a power control device in a hierarchy of power control devices including the second processor, wherein the first processor is configured to:

manage power available to power control devices below the first processor in the hierarchy; and have the total power budget available to the first processor controlled by power control devices above the first processor in the hierarchy.

* * * * *